(12) United States Patent
Kinjo et al.

(10) Patent No.: US 11,196,372 B2
(45) Date of Patent: Dec. 7, 2021

(54) CONTROL APPARATUS FOR ROTATING ELECTRIC MACHINE

(71) Applicant: DENSO CORPORATION, Kariya (JP)

(72) Inventors: Hirofumi Kinjo, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/931,919

(22) Filed: May 14, 2020

(65) Prior Publication Data

US 2020/0366227 A1    Nov. 19, 2020

(30) Foreign Application Priority Data

May 14, 2019    (JP) .............................. JP2019-091715

(51) Int. Cl.
| | |
|---|---|
| *H02P 21/00* | (2016.01) |
| *H02P 21/22* | (2016.01) |
| *H02P 27/12* | (2006.01) |
| *B60L 3/00* | (2019.01) |

(52) U.S. Cl.
CPC ............ *H02P 21/22* (2016.02); *B60L 3/0038* (2013.01); *H02P 27/12* (2013.01); *H02P 2209/03* (2013.01)

(58) Field of Classification Search
CPC ...... H02P 21/22; H02P 27/12; H02P 2209/03; H02P 27/08; H02P 27/085; H02P 29/50; H02M 1/12
See application file for complete search history.

(56) References Cited

U.S. PATENT DOCUMENTS

| | | | |
|---|---|---|---|
| 2017/0294864 A1* | 10/2017 | Tada | ........................ H02P 29/50 |
| 2017/0359008 A1* | 12/2017 | Kano | ....................... H02P 29/64 |
| 2018/0375454 A1 | 12/2018 | Araki et al. | |

FOREIGN PATENT DOCUMENTS

| | | |
|---|---|---|
| JP | S63-224693 A | 9/1988 |
| JP | 2004-080975 A | 3/2004 |
| JP | 2017-077061 A | 4/2017 |
| JP | 2017-169251 A | 9/2017 |

\* cited by examiner

*Primary Examiner* — Karen Masih
(74) *Attorney, Agent, or Firm* — Oliff PLC

(57) ABSTRACT

A control apparatus for a rotating electric machine is applied to a rotating electric machine system. The rotating electric machine system includes a rotating electric machine having a multiple-phase winding, a first inverter connected to a first end of the winding for each phase, a second inverter connected to a second end of the winding for each phase, a high-potential-side connection line, and a low-potential-side connection line. The control apparatus acquires a parameter that has a correlation with a fundamental current that flows to the winding of each phase. The control apparatus stores, in a storage unit, correspondence information in which the parameter is associated with an amplitude and a phase of a harmonic voltage that is generated in the rotating electric machine. The control apparatus controls each of the first inverter and the second inverter to suppress the harmonic voltage based on the correspondence information and the acquired parameter.

9 Claims, 13 Drawing Sheets

[SECOND MODE]

FIG.6

MPS

| Ψz | Id1* [A] | Id2* [A] | Id3* [A] | Id4* [A] | Id5* [A] | Id6* [A] | Id7* [A] | Id8* [A] | Id9* [A] |
|---|---|---|---|---|---|---|---|---|---|
| Iq1*[A] | Ψ11 | Ψ12 | Ψ13 | ........ | ........ | ........ | ........ | ........ | Ψ19 |
| Iq2*[A] | Ψ21 | | | | | | | | |
| Iq3*[A] | Ψ31 | | | | | | | | |
| Iq4*[A] | : | | | | | | | | |
| Iq5*[A] | : | | | | | | | | |
| Iq6*[A] | : | | | | | | | | |
| Iq7*[A] | : | | | | | | | | |
| Iq8*[A] | : | | | | | | | | |
| Iq9*[A] | Ψ91 | | | | | | | | Ψ99 |

| θz | Id1* [A] | Id2* [A] | Id3* [A] | Id4* [A] | Id5* [A] | Id6* [A] | Id7* [A] | Id8* [A] | Id9* [A] |
|---|---|---|---|---|---|---|---|---|---|
| Iq1*[A] | θ11 | θ12 | θ13 | ........ | ........ | ........ | ........ | ........ | θ19 |
| Iq2*[A] | θ21 | | | | | | | | |
| Iq3*[A] | θ31 | | | | | | | | |
| Iq4*[A] | : | | | | | | | | |
| Iq5*[A] | : | | | | | | | | |
| Iq6*[A] | : | | | | | | | | |
| Iq7*[A] | : | | | | | | | | |
| Iq8*[A] | : | | | | | | | | |
| Iq9*[A] | θ91 | | | | | | | | θ99 |

CONTROL APPARATUS FOR ROTATING ELECTRIC MACHINE

CROSS-REFERENCE TO RELATED APPLICATIONS

This application is based on and claims the benefit of priority from Japanese Patent Application No. 2019-091715, filed May 14, 2019. The entire disclosure of the above application is incorporated herein by reference.

BACKGROUND

Technical Field

The present disclosure relates to a control apparatus for a rotating electric machine.

Related Art

A rotating electric machine system that includes a rotating electric machine having an open-end winding is known. In the rotating electric machine system, a first inverter is connected to a first end and a second inverter is connected to a second end of both ends of a winding of each phase that configures the rotating electric machine. A high potential side of the first inverter and a high potential side of the second inverter are connected by a high-potential-side connection line. A low potential side of the first inverter and a low potential side of the second inverter are connected by a low-potential-side connection line.

SUMMARY

An aspect of the present disclosure provides a control apparatus for a rotating electric machine that is applied to a rotating electric machine system The rotating electric machine system includes a rotating electric machine having a multiple-phase winding, a first inverter connected to a first end of the winding for each phase, a second inverter connected to a second end of the winding for each phase, a high-potential-side connection line, and a low-potential-side connection line. The control apparatus acquires a parameter that has a correlation with a fundamental current that flows to the winding of each phase. The control apparatus stores, in a storage unit, correspondence information in which the parameter is associated with an amplitude and a phase of a harmonic voltage that is generated in the rotating electric machine. The control apparatus controls each of the first inverter and the second inverter to suppress the harmonic voltage based on the correspondence information and the acquired parameter.

BRIEF DESCRIPTION OF THE DRAWINGS

In the accompanying drawings:
FIG. 6 is a diagram of a command value map;

DESCRIPTION OF THE EMBODIMENTS

Figure 1:
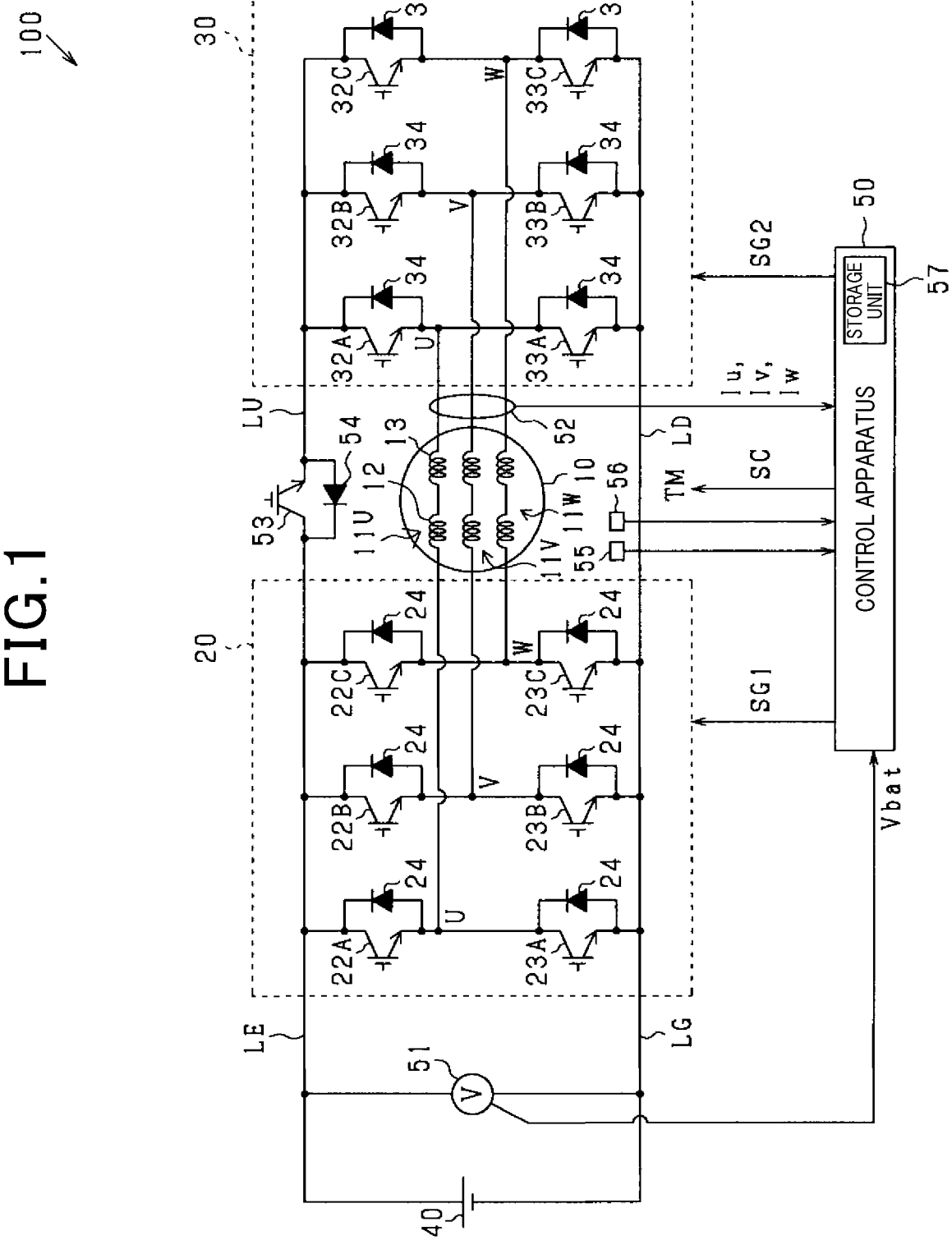
FIG. 1 is an overall configuration diagram of a rotating electric machine system.

Conventionally, a rotating electric machine system that includes a rotating electric machine having an open-end winding is known (for example, refer to JP-A-2017-077061). In the rotating electric machine system, a first inverter is connected to a first end and a second inverter is connected to a second end of both ends of a winding of each phase that configures the rotating electric machine. In addition, a high potential side of the first inverter and a high potential side of the second inverter are connected by a high-potential-side connection line. A low potential side of the first inverter and a low potential side of the second inverter are connected by a low-potential-side connection line.

In the above-described rotating electric machine system, H-bridge driving can be performed when the rotating electric machine is driven. In H-bridge driving, pulse width modulation (PWM) driving is performed on upper and lower arm switches of each inverter.

In the rotating electric machine system, a zero-phase current may not become zero. The zero-phase current is obtained by a fundamental current that flows through the winding of each phase in the rotating electric machine being added. When the zero-phase current does not become zero, a zero-phase voltage that includes a 3×(2n−1)-order harmonic voltage is generated. The zero-phase voltage is a disturbance voltage to the rotating electric machine. Driving loss in the rotating electric machine increases as a result of the zero-phase voltage. In the technology described in JP-A-2017-077061, an average value of the generated zero-phase voltages is stored. The zero-phase current is then suppressed by each inverter being controlled using the average value.

When the inverters are controlled using the average value of the zero-phase voltages, a predetermined calculation period is required until the average value is calculated. Responsiveness regarding suppression of the zero-phase current becomes poor. Therefore, for example, in a case in which a rotation speed of the rotating electric machine changes, an issue arises in that the zero-phase current cannot be sufficiently suppressed if the zero-phase current transiently changes.

It is thus desired to provide a control apparatus for a rotating electric machine that is capable of suppressing a zero-phase current with favorable responsiveness.

An exemplary embodiment of the present disclosure provides a control apparatus for a rotating electric machine that is applied to a rotating electric machine system. The rotating electric machine system includes: a rotating electric machine that has a multiple-phase winding; a first inverter that is connected to a direct-current power supply and a first end of the winding for each phase; a second inverter that is connected to a second end of the winding for each phase; a high-potential-side connection line that connects a high potential side of the first inverter and a high potential side of the second inverter; and a low-potential-side connection line that connects a low potential side of the first inverter and a low potential side of the second inverter.

The control apparatus includes: a parameter acquiring unit that acquires a parameter that has a correlation with a fundamental current that flows to the winding of each phase; a storage unit that stores therein correspondence information in which the parameter is associated with an amplitude and a phase of a harmonic voltage that is generated in the rotating electric machine; and a control unit that controls each of the first inverter and the second inverter to suppress the harmonic voltage based on the correspondence information and the acquired parameter.

In the rotating electric machine system that includes the rotating electric machine that has an open-end winding, when the rotating electric machine is driven using the first inverter and the second inverter, a zero-phase current that flows to the rotating electric machine may not become zero. When the zero-phase current flows, driving loss occurs in the rotating electric machine. Therefore, the zero-phase current is required to be suppressed.

In this case, it is preferable that the zero-phase current be suppressed with favorable responsiveness in response to changes in a rotation speed of the rotating electric machine. In this regard, in the above-described configuration, the correspondence information in which the amplitude and the phase of the harmonic voltage, and the parameter that is correlated with the fundamental current flowing to the winding of each phase are associated is stored in the storage unit.

In addition, when each inverter is controlled to suppress the harmonic voltage, each inverter is controlled based on the correspondence information and the acquired parameter. Because each inverter is controlled based on the correspondence information that is prescribed in advance, the zero-phase current can be suppressed with favorable responsiveness, compared to when each inverter is controlled using an average value of zero-phase voltages.

First Embodiment

A control apparatus for a rotating electric machine according to a first embodiment of the present disclosure will hereinafter be described with reference to the drawings. According to the first embodiment, the control apparatus is applied to a rotating electric machine system 100 that is mounted in a vehicle.

As shown in FIG. 1, the rotating electric machine system 100 according to the present embodiment includes a rotating electric machine 10, a first inverter 20, a second inverter 30, and a control apparatus 50. The control apparatus 50 controls the rotating electric machine 10.

The rotating electric machine 10 provides a function for regenerative power generation and a function for power-running driving. Specifically, the rotating electric machine 10 is a motor generator (MG). The rotating electric machine 10 inputs electric power to a battery 40 and receives output of electric power from the battery 40. During power running, the rotating electric machine 10 applies driving force to the vehicle using electric power that is supplied by the battery 40. During regeneration, the rotating electric machine 10 performs power generation using deceleration energy of the vehicle and outputs electric power to the battery 40.

The rotating electric machine 10 includes an open-end winding 11 for three phases. The winding 11 is a multiple-phase winding that corresponds to a U-phase, a V-phase, and a W-phase. U-, V-, and W-phase windings 11U, 11V, and 11W each include a first winding portion 12 and a second winding portion 13. The first winding portion 12 and the second winding portion 13 are connected in series. A rotor of the rotating electric machine 10 is connected to a driving wheel of the vehicle so as to be capable of transmitting power (torque). For example, the rotating electric machine 10 is a synchronous motor.

The winding 11 of the three phases of the rotating electric machine 10 is connected to the battery 40 via the first inverter 20. The battery 40 serves as a direct-current power supply unit. The battery 40 is a storage battery that is capable of being charged and discharged. Specifically, the battery 40 is an assembled battery (also called a battery pack) in which a plurality of lithium-ion storage batteries are connected in series. Here, the battery 40 may be another type of storage battery. According to the present embodiment, the battery 40 corresponds to a "direct-current power supply".

The first inverter 20 is configured by series-connection bodies composed of upper arm switches 22 (22A, 22B, 22C) and lower arm switches 23 (23A, 23B, and 23C) being connected in parallel. The upper arm switches 22 are switching elements on a high potential side. The lower arm switches 23 are switching elements on a low potential side. A first end of the winding 11 of each phase is connected to a connection point between the upper arm switch 22 and the lower arm switch 23 of the corresponding phase. Here, according to the present embodiment, a voltage-control-type semiconductor switching element is used as each of the switches 22 and 23. More specifically, an insulated-gate bipolar transistor (IGBT) is used. A freewheeling diode 24 is connected in antiparallel to each switch.

The second inverter 30 is configured by series-connection bodies composed of upper arm switches 32 (32A, 32B, 32C) and lower arm switches 33 (33A, 33B, and 33C) being connected in parallel. The upper arm switches 32 are switching elements on the high potential side. The lower arm switches 33 are switching elements on the low potential side. A second end of the winding 11 of each phase is connected to a connection point between the upper arm switch 32 and the lower arm switch 33 of the corresponding phase. Here, according to the present embodiment, a voltage-control-type semiconductor switching element is used as each of the switches 32 and 33. More specifically, an IGBT is used. A freewheeling diode 34 is connected in antiparallel to each switch.

A high potential side of the battery 40 and a high potential side of the first inverter 20 are connected by a power supply line LE. A low potential side of the battery 40 and a low potential side of the first inverter 20 are connected by a grounding line LG. In addition, the high potential side of the first inverter 20 and a high potential side of the second inverter 30 are connected by a high-potential-side connection line LU. The low potential side of the first inverter 20 and a low potential side of the second inverter 30 are connected by a low-potential-side connection line LD. As a result, the second inverter 30 is connected to the battery 40 via the first inverter 20.

A switchover switch 53 is provided on the high-potential-side connection line LU. According to the present embodiment, a voltage-control-type semiconductor switching element is used as the switchover switch 53. More specifically, an IGBT is used. A freewheeling diode 54 is connected to the switchover switch 53 such that a direction in which a current flows from the second inverter 30 to the first inverter 20 is a forward direction.

The rotating electric machine system 100 includes a voltage sensor 51, a current sensor 52, an angle sensor 55, and a temperature sensor 56. The voltage sensor 51 detects a power supply voltage Vbat of the battery 40. The current sensor 52 detects phase currents Iu, Iv, and Iw that flow to the winding 11 of the three phases of the rotating electric machine 10. The angle sensor 55 (such as a resolver) detects a rotation angle of the rotating electric machine 10. The temperature sensor 56 detects a temperature TM of the rotating electric machine 10. A detection value of each sensor is inputted to the control apparatus 50.

The control apparatus 50 calculates an electrical angle θ of the rotating electric machine 10 based on the detection value of the angle sensor 55. In addition, the control apparatus 50 performs a control process in which the first inverter 20 and the second inverter 30 are controlled so that a controlled variable of the rotating electric machine 10 is controlled to a command value thereof, based on the acquired detection values. For example, the controlled variable is torque Tr. Here, according to the present embodiment, the current sensor 52 corresponds to a "current detecting unit". The temperature sensor 56 corresponds to a "temperature detecting unit".

Specifically, when the first inverter 20 is controlled, the control apparatus 50 outputs, to each of the switches 22 and 23, a first driving signal SG1 that corresponds to each of the switches 22 and 23, so that the switches 22 and 23 are alternately set to an on-state (closed state) with a dead time therebetween. The first driving signal SG1 is set to either of an on-command that commands that the switch be switched to the on-state and an off-command that commands that the switch be switched to an off-state (open state).

In addition, when the second inverter 30 is controlled, the control apparatus 50 outputs, to each of the switches 32 and 33, a second driving signal SG2 that corresponds to each of the switches 32 and 33, such that the switches 22 and 23 are alternately set to the on-state with the dead time therebetween.

Furthermore, the control apparatus 50 acquires an operation state of the rotating electric machine 10 based on the acquired detection values. For example, the operation state of the rotating electric machine 10 is a high-speed rotation state or a low-speed rotation state. In addition, the control apparatus 50 calculates a switchover signal SC so that a switching operation of the switchover switch 53 is performed, based on the acquired operation state. The control apparatus 50 then outputs the calculated switchover signal SC to the switchover switch 53. The control apparatus 50 calculates the first driving signal SG1 and the second driving signal SG2 so as to correspond to the calculated switchover signal SC.

Specifically, when the rotating electric machine 10 is in the high-speed rotation state, the switchover signal SC is set to the on-command. As a result, the switchover switch 53 is switched to the on-state. The first inverter 20 and the second inverter 30 are driven by H-bridge driving. In H-bridge driving, the first inverter 20 and the second inverter 30 are controlled by PWM driving. In PWM driving, the state of the upper and lower arm switches of each phase is controlled based on a comparison of magnitude between a target voltage that is a target value of an output voltage that is outputted to the rotating electric machine 10, and a carrier signal such as a triangular wave signal. Here, according to the present embodiment, PWM driving corresponds to "switching driving".

Figure 2:
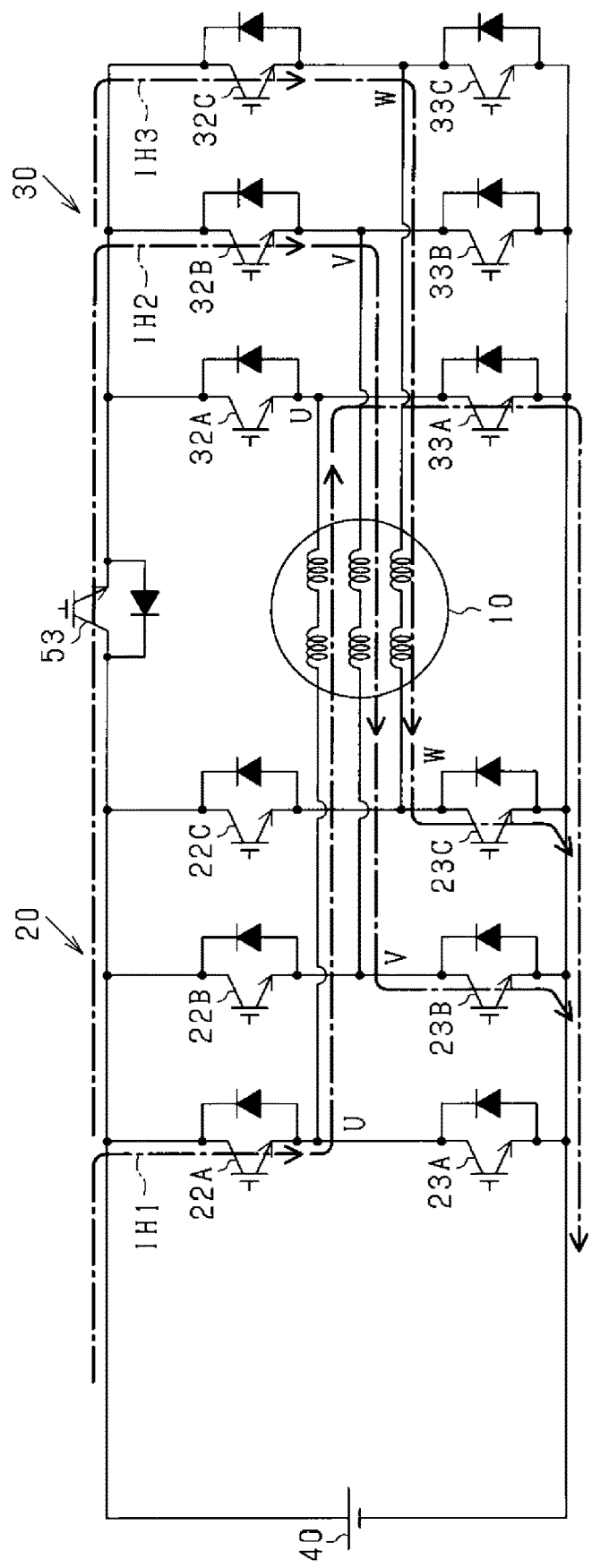
FIG. 2 is a diagram of a current path in a second mode.

FIG. 2 shows an example of a current path when the first inverter 20 and the second inverter 30 are driven by H-bridge driving. In the example shown in FIG. 2, control is performed such that the U-phase upper arm switch 22A of the first inverter 20 and the U-phase lower arm switch 33A of the second inverter 30, the V-phase lower arm switch 23B of the first inverter 20 and the V-phase upper arm switch 32B of the second inverter 30, and the W-phase lower arm switch 23C of the first inverter 20 and the W-phase upper arm switch 32C of the second inverter 30 are synchronized. In addition, in each of a first switch pair composed of the U-phase upper arm switch 22A of the first inverter 20 and the U-phase lower arm switch 33A of the second inverter 30, a second switch pair composed of the V-phase lower arm switch 23B of the first inverter 20 and the V-phase upper arm switch 32B of the second inverter 30, and a third switch pair composed of the W-phase lower arm switch 23C of the first inverter 20 and the W-phase upper arm switch 32C of the second inverter 30, one switch may be fixed to the on-state and only the other switch may be controlled. Here, the voltage sensor 51, the current sensor 52, and the like are omitted in FIG. 2. This similarly applies to FIG. 3.

As shown in FIG. 2, when the upper arm switch 22A, and the lower arm switches 23B and 23C of the first inverter 20, and the upper arm switches 32B and 32C, and the lower arm switch 33A of the second inverter 30 are set to the on-state, a current flows over a path that is indicated by arrows IH1 to IH3.

In addition, when the rotating electric machine 10 is in the low-speed rotation state, the switchover signal SC is set to the off-command. As a result, the switchover switch 53 is switched to the off-state. The first inverter 20 and the second inverter 30 are driven by Y-connection (star-connection) driving. In Y-connection driving, either of the first inverter 20 and the second inverter 30 is controlled by PWM driving, and the other is driven by neutral-point driving. Here, in neutral-point driving, among the switches of the inverter that is being driven by neutral-point driving, the upper arm switch on the side on which the switchover switch 53 is provided is maintained in the on-state. The lower arm switch on the side on which the switchover switch 53 is not provided is maintained in the off-state. As a result of neutral point driving, a neutral point is provided in the inverter that is being driven by neutral-point driving. The rotating electric machine 10 is connected by Y-connection.

Figure 3:
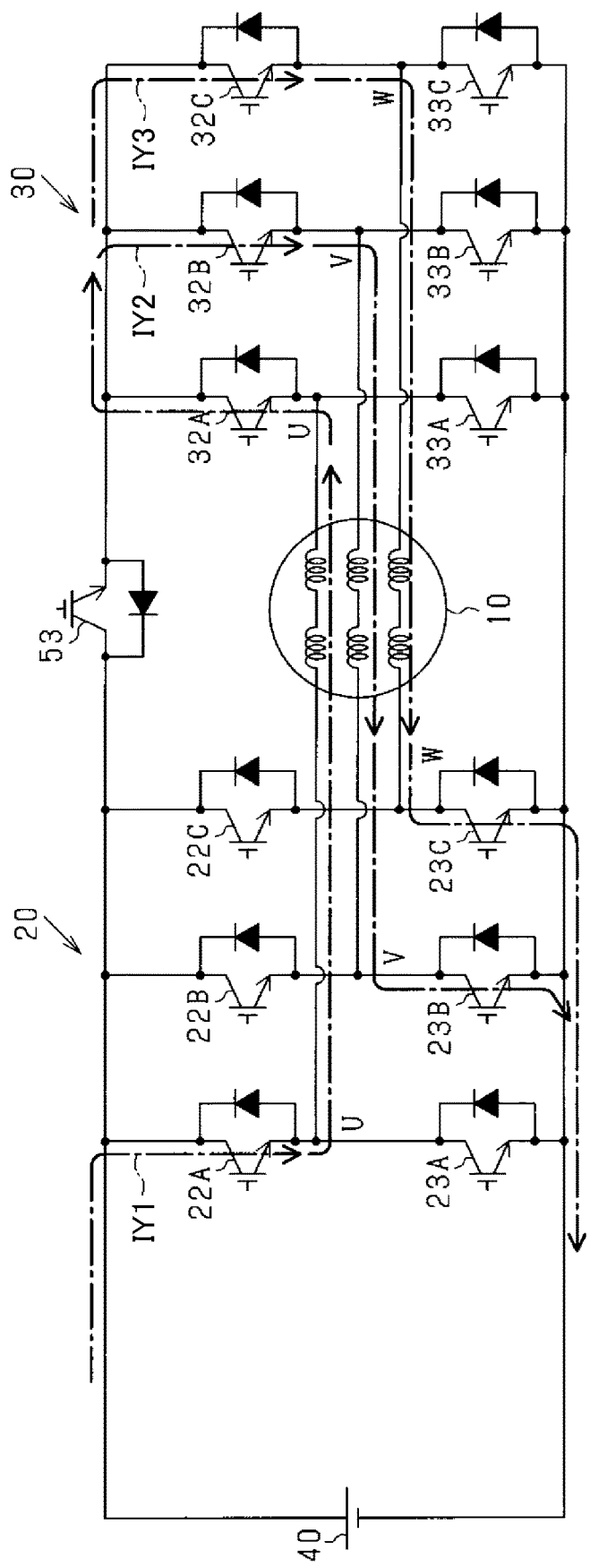
FIG. 3 is a diagram of a current path in a first mode.

FIG. 3 shows an example of a current path when the first inverter 20 and the second inverter 30 are driven by Y-connection driving. In the example shown in FIG. 3, the first inverter 20 on the battery 40 side is driven by PWM driving. In addition, the second inverter 30 on the side opposite the battery 40 is driven by neutral-point driving.

As shown in FIG. 3, when the upper arm switch 22A, and the lower arm switches 23B and 23C of the first inverter 20, and the upper arm switches 32A, 32B, and 32C of the second inverter 30 are set to the on-state, a current flows over a path that is indicated by arrows IY1 to IY3. Hereafter, an operation mode in which the first inverter 20 and the second inverter 30 are driven by Y-connection driving is referred to as a first mode. An operation mode in which the first inverter 20 and the second inverter 30 are driven by H-bridge driving is referred to as a second mode.

Figure 4:
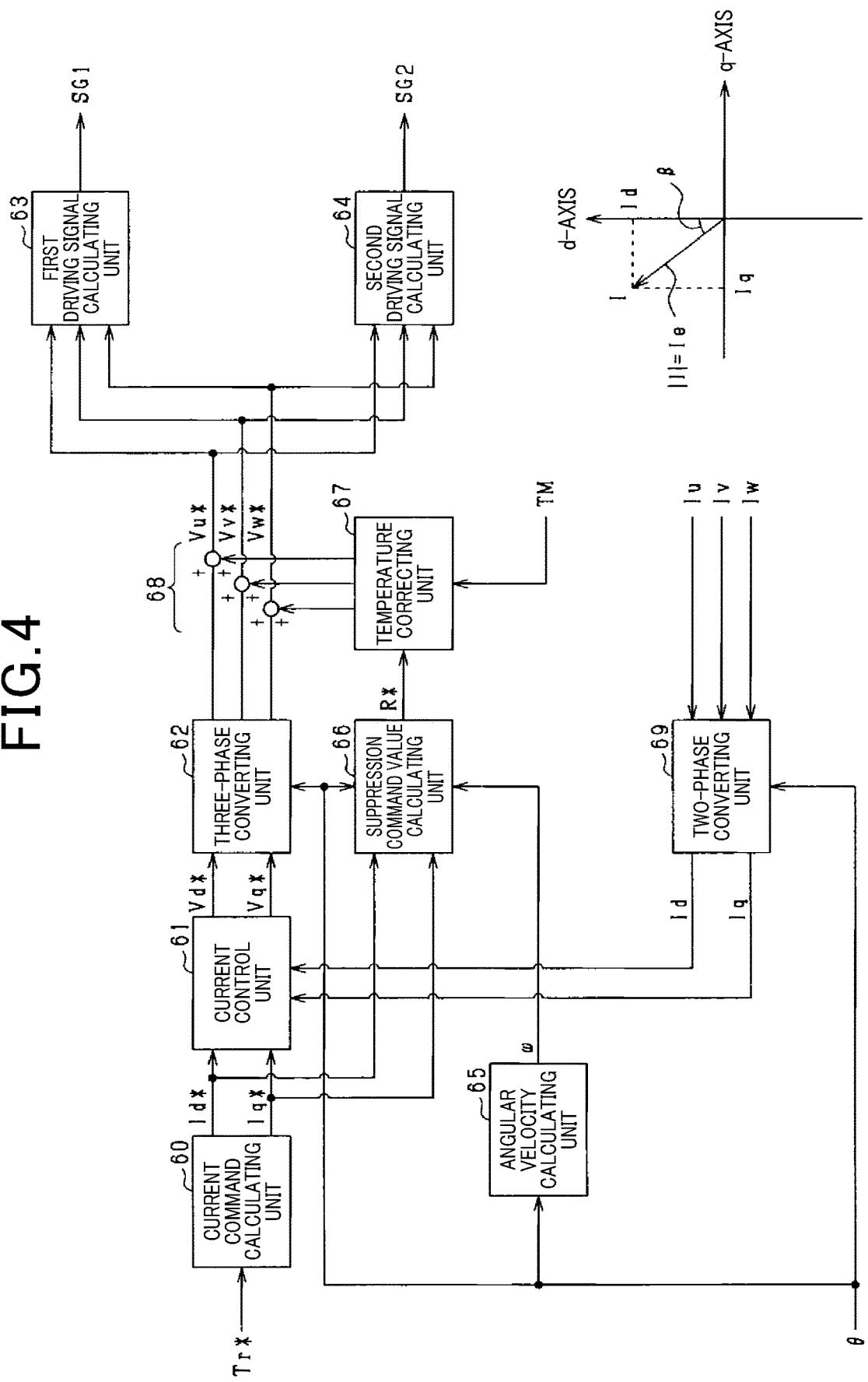
FIG. 4 is a diagram of a circuit configuration of a control apparatus according to a first embodiment.

Next, a circuit configuration of the control apparatus 50 is described with reference to FIG. 4.

A two-phase converting unit 69 extracts fundamental currents of the U-, V-, and W-phases from the phase currents Iu, Iv, and Iw detected by the current sensor 52. Based on the extracted fundamental currents and the electrical angle θ, the two-phase converting unit 69 converts the fundamental currents in a three-phase fixed coordinate system of the rotating electric machine 10 to d- and q-axis components (hereafter, d- and q-axis currents) Id and Iq of the fundamental currents in a two-phase rotating coordinate system (dq coordinate system).

Based on a torque command value Tr* that is set for the rotating electric machine 10, a current command value calculating unit 60 calculates d- and q-axis current command values Id* and Iq* as manipulated variables for setting the torque Tr to the torque command value Tr*. The torque Tr serves as the controlled variable of the rotating electric machine 10. The current command value calculating unit 60 calculates the d- and q-axis current command values Id* and Iq* by referencing a d- and q-axis torque map that is stored, in advance, in a storage unit 57 (see FIG. 1) of the control apparatus 50. The d- and q-axis torque map is map information that prescribes, in advance, the d- and q-axis current command values Id* and Iq* in association with the torque command value Tr*. Here, for example, the storage unit 57 is a rewritable nonvolatile memory, such as a read-only memory (ROM).

Based on the d- and q-axis current command values Id* and Iq* outputted from the current command value calculating unit 60, a current controller 61 calculates d- and q-axis voltage command values Vd* and Vq* as manipulated variables for setting the d- and q-axis currents Id and Iq outputted from the two-phase converting unit 69 to the d- and q-axis current command values Id* and Iq*.

Based on the d- and q-axis voltage command values Vd* and Vq* outputted from the current controller 61 and the electrical angle θ, the three-phase converting unit 62 converts the d- and q-axis voltage command values Vd* and Vq* in the two-phase rotating coordinate system to U-, V-, and W-phase voltage command values Vu*, Vv*, and Vw* in the three-phase fixed coordinate system. The three-phase converting unit 62 converts the d- and q-axis voltage command values Vd* and Vq* to the U-, V-, and W-phase voltage command values Vu*, Vv*, and Vw* that are sine wave signals that have the electrical angle θ and of which the phases are shifted from each other by 120°.

Based on the U-, V-, and W-phase voltage command values Vu*, Vv*, and Vw* outputted from the three-phase converting unit 62 and the carrier signal, such as a triangular wave signal, a first driving signal calculating unit 63 calculates the first driving signal SG1 for turning on/off the switches 22 and 23 of the first inverter 20. That is, the first driving signal calculating unit 63 calculates the first driving signal SG1 for turning on/off the switches 22 and 23 of the first inverter 20 so as to control the d- and q-axis currents Id and Iq outputted from the two-phase converting unit 69 to the d- and q-axis current command values Id* and Iq* outputted from the current command value calculating unit 60.

Based on the U-, V-, and W-phase voltage command values Vu*, Vv*, and Vw* outputted from the three-phase converting unit 62 and the carrier signal, such as a triangular wave signal, a second driving signal control unit 64 calculates the second driving signal SG2 for turning on/off the switches 32 and 33 of the second inverter 30. That is, the second driving signal control unit 64 calculates the second driving signal SG2 for turning on/off the switches 32 and 33 of the second inverter 30 so as to control the d- and q-axis currents Id and Iq outputted from the two-phase converting unit 69 to the d- and q-axis current command values Id* and Iq* outputted from the current command value calculating unit 60.

Here, as shown in FIG. 3, in the first mode, the current that flows over the path that is indicated by arrow IY1 is divided into two on the high potential side of the second inverter 30. The divided currents respectively flow through the paths indicated by arrows IY2 and IY3. Therefore, a zero-phase current Iz that is obtained by the phase currents Iu, Iv, and Iw flowing to the winding 11 of the three phases of the rotating electric machine 10 being added is zero at all times.

Meanwhile, as shown in FIG. 2, in the second mode, because a current flows in each of the paths indicated by the arrows IH1 to IH3 from the battery 40, the zero-phase current Iz may not become zero. When the zero-phase current Iz does not become zero, a zero-phase voltage Vz that includes a 3×(2n−1)-order harmonic voltage is generated in the rotating electric machine 10. Driving loss in the rotating electric machine 10 increases.

As described above, the zero-phase current Iz and the zero-phase voltage Vz are correlated. Therefore, it can also be considered that, as a result of the zero-phase voltage Vz being detected, and feedback control of the phase currents Iu, Iv, and Iq being performed based on the zero-phase voltage Vz, the zero-phase current Iz can be suppressed.

However, the zero-phase voltage Vz is a disturbance voltage of the rotating electric machine 10 and varies at all times. Therefore, to suppress the zero-phase current Iz using the zero-phase voltage Vz, the zero-phase voltage Vz is required to be detected over a predetermined calculation period Δt (see FIG. 10B). The zero-phase current Iz is then suppressed using an average value of the detected zero-phase voltages Vz. Responsiveness in suppression of the zero-phase current Iz becomes poor. Therefore, for example, in a case in which a rotation speed NE of the rotating electric machine 10 changes based on acceleration and deceleration of the vehicle, an issue arises in that the zero-phase current Iz cannot be sufficiently suppressed if the zero-phase current Iz transiently changes.

The inventors of the present disclosure have found that the fundamental currents that flow to the winding 11 of the three phases and the zero-phase voltage Vz are correlated. With focus on this finding, the inventors of the present disclosure have found that, if the correlation between the fundamental currents and the zero-phase voltage Vz is acquired in advance, the zero-phase current Iz can be suppressed with favorable responsiveness. Hereafter, a description will be given using a third harmonic voltage Vz as an example among the zero-phase voltages Vz.

Figure 5A:
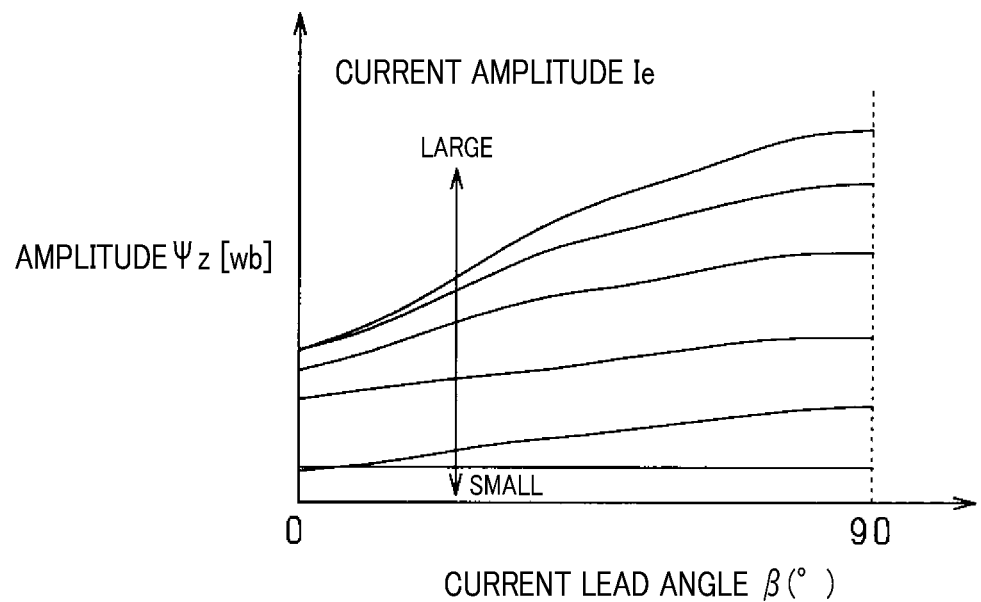
FIG. 5A is a diagram of relationships between a current amplitude and a current phase of a fundamental current.
Figure 5B:
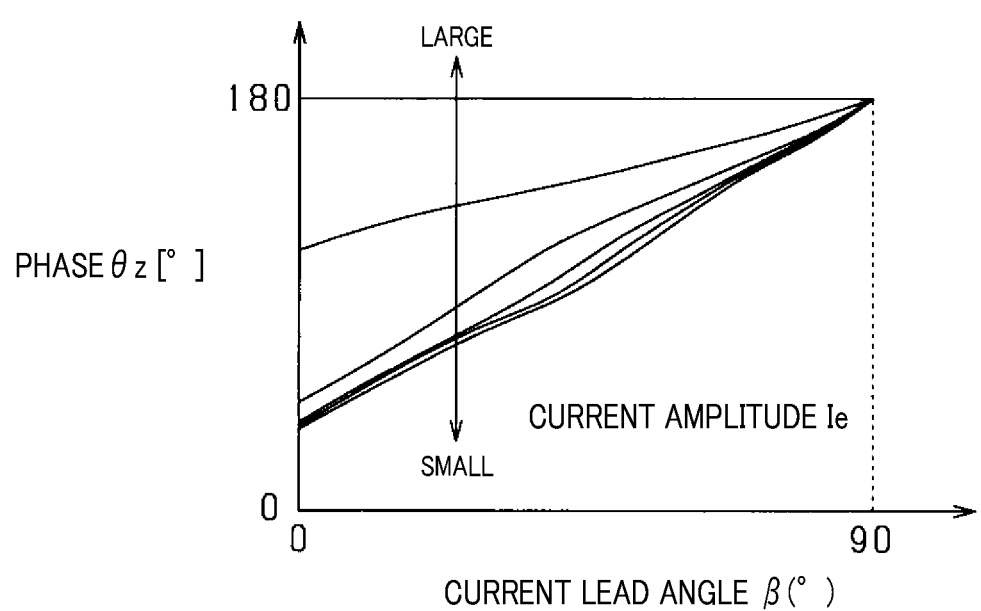
FIG. 5B is a diagram of relationships between an amplitude and a phase of a harmonic voltage.

FIG. 5A shows a relationship between a current amplitude Ie and a current phase β of the fundamental current (see FIG. 4), and FIG. 5B shows a relationship between an amplitude Ψz and a phase θz of the harmonic voltage Vz. The current amplitude Ie and the current phase β are expressed as in (Expression 1) and (Expression 2) using the d- and q-axis currents Id and Iq that are conversions of the phase currents Iu, Iv, and Iw.

$$Ie=\sqrt{(I\hat{d}2+I\hat{q}2)} \quad \text{(Expression 1)}$$

$$B=\arc\tan(Id/Iq) \quad \text{(Expression 2)}$$

As shown in FIG. 5A, the amplitude Ψz of the harmonic voltage Vz has a correlation in which the amplitude Ψz increases as the current phase β increases or the current amplitude Ie increases. In addition, as shown in FIG. 5B, the phase θz of the harmonic voltage Vz has a correlation in which the phase θz decreases as the current phase β decreases or the current amplitude Ie decreases.

Correspondence information indicating the correlations is stored in the storage unit 57 (see FIG. 1) of the control apparatus 50. According to the present embodiment, a command value map MPS is stored as the correspondence information. In the command value map MPS, the amplitude Ψz and the phase θz of the harmonic voltage Vz are prescribed, in advance, in correspondence to the d- and q-axis current command values Id* and Iq*. FIG. 6 shows the command value map MPS. As shown in FIG. 6, the command value map MPS is map information in which setting values Ψ11 to Ψ99 and θ11 to θ99 of the amplitude Ψz and the phase θz are prescribed in correspondence to a plurality of selection values Id1* to Id9* and Iq1* to Iq9* (nine values in the example in FIG. 6) that are set for the current command values. Here, according to the present embodiment, the d- and q-axis current command values Id* and Iq* correspond to "parameter".

In the control process, the control apparatus 50 controls the inverters 20 and 30 to suppress the harmonic voltage Vz based on the command value map MPS. Specifically, as shown in FIG. 4, the control apparatus 50 includes an angular velocity calculating unit 65, a suppression command value calculating unit 66, a temperature correcting unit 67, and a voltage correcting unit 68. The angular velocity calculating unit 65 calculates an electrical angular velocity ω as a time differential value of the electrical angle θ.

The suppression command value calculating unit 66 calculates a suppression command value R* as a manipulated variable for suppressing the harmonic voltage Vz, based on the d- and q-axis current command values Id* and Iq* outputted from the current command value calculating unit 60, the electrical angular velocity ω outputted from the angular velocity calculating unit 65, and the electrical angle θ. The suppression command value calculating unit 66 selects the amplitude Ψz and the phase θz of the harmonic voltage Vz from the command value map MPS stored in the storage unit 57, based on the d- and q-axis current command values Id* and Iq*, and calculates the suppression command value R*. The suppression command value R* is expressed as in (Expression 3) using the amplitude Ψz, the phase θz, the electrical angle θ, and the electrical angular velocity ω.

$$R^* = 3\omega \times \Psi z \times \sin(3\theta + \theta z) \quad \text{(Expression 3)}$$

Figure 7:
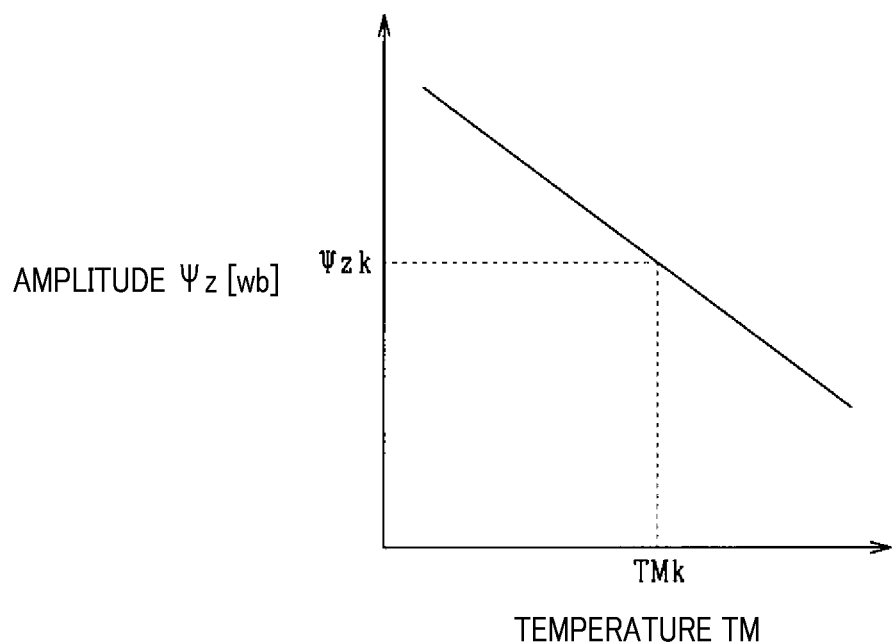
FIG. 7 is a diagram of a relationship between a temperature of a rotating electric machine and the amplitude of the harmonic voltage.

The temperature correcting unit 67 corrects the suppression command value R* outputted from the suppression command value calculating unit 66 based on the temperature TM of the rotating electric machine 10 detected by the temperature sensor 56. FIG. 7 shows a relationship between the temperature TM of the rotating electric machine 10 and the amplitude Ψz of the harmonic voltage Vz. As shown in FIG. 7, the harmonic voltage Vz is characteristic in that the amplitude Ψz decreases as the temperature TM increases. In the command value map MPS, the setting values Ψ11 to Ψ99 of a reference amplitude Ψzk corresponding to a reference temperature TMk are stored. The temperature correcting unit 67 corrects the suppression command value R* so that the reference amplitude Ψzk that composes the amplitude of the suppression command value R* is the amplitude Ψz that corresponds to the temperature TM.

The voltage correcting unit 68 corrects the U-, V-, and W-phase voltage command values Vu*, Vv*, and Vw* outputted from the three-phase converting unit 62 using the suppression command value R* corrected by the temperature correcting unit 67. The voltage correcting unit 68 corrects the U-, V-, and W-phase voltage command values Vu*, Vv*, and Vw* by adding the suppression command value R* to the U-, V-, and W-phase voltage command values Vu*, Vv*, and Vw*. Therefore, the first and second driving signal calculating units 63 and 64 calculate the first and second driving signals SG1 and SG2 based on the U-, V-, and W-phase voltage command values Vu*, Vv*, and Vw* corrected by the voltage correcting unit 68.

Figure 8:
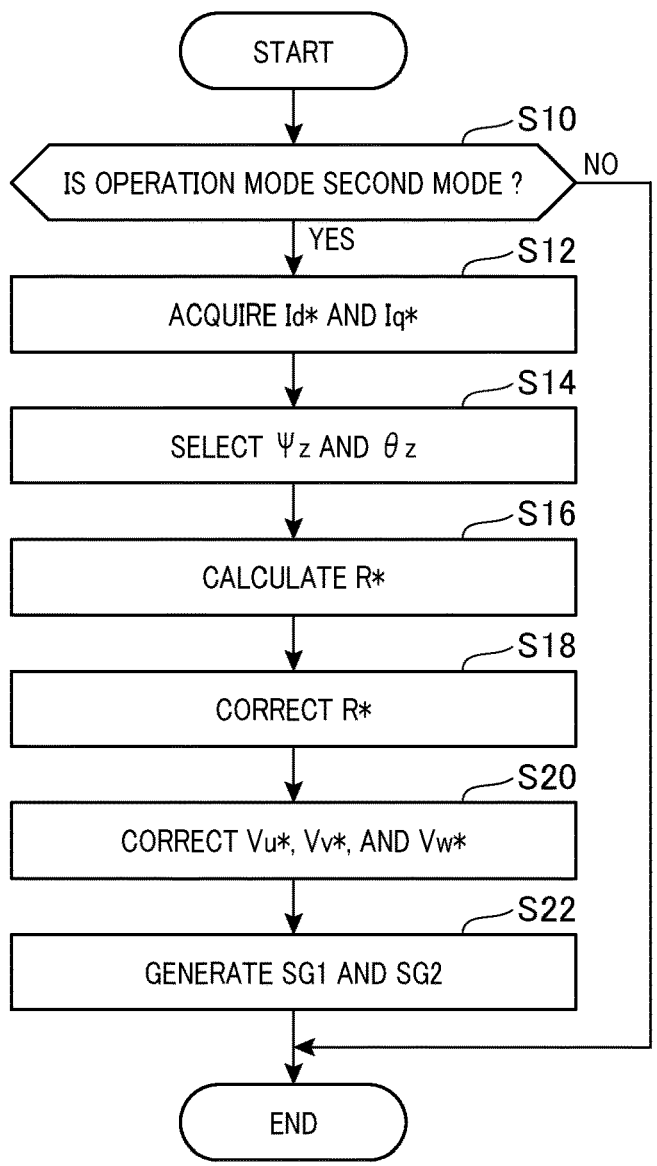
FIG. 8 is a flowchart of a control process according to the first embodiment.

FIG. 8 shows a flowchart of the control process according to the present embodiment. According to the present embodiment, a flowchart of a control process that is performed during power running of the rotating electric machine 10 is shown. The control apparatus 50 repeatedly performs the control process every predetermined amount of time, during operation of the rotating electric machine 10.

Upon starting the control process, first, at step S10, the control apparatus 50 determines whether the operation mode is the second mode. The control apparatus 50 determines the operation mode based on the rotation speed NE and the torque Tr of the rotating electric machine 10.

Figure 9:
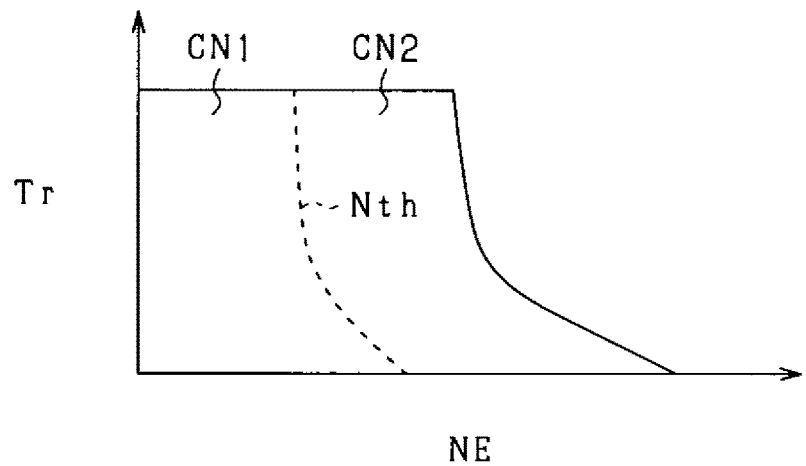
FIG. 9 is a diagram of a relationship between a first operation condition and a second operation condition.

FIG. 9 shows a first operation condition CN1 and a second operation condition CN2. Here, the first operation condition CN1 is a condition regarding the rotation speed NE at which the first mode is performed. The second operation condition CN2 is a condition regarding the rotation speed NE at which the second mode is performed. As shown in FIG. 9, the second operation condition CN2 is set further towards the high-rotation-speed side than the first operation condition CN1. A threshold Nth is set at a border between the first operation condition CN1 and the second operation condition CN2. The first operation condition CN1, the second operation condition CN2, and the threshold Nth are set for each torque Tr of the rotating electric machine 10.

When the rotation speed NE is less than the threshold Nth, the rotation speed NE satisfies the first operation condition CN1. In this case, because the inverters 20 and 30 are switched to the first mode, the control apparatus 50 determines NO, i.e., the operation mode is not the second mode, at step S10. In this case, the control apparatus 50 ends the control process. Here, for example, the rotation speed NE may be calculated based on the electrical angular velocity ω.

Meanwhile, when the rotation speed NE is greater than the threshold Nth, the rotation speed NE satisfies the second operation condition CN2. In this case, the inverters 20 and 30 are switched to the second mode. Therefore, the control apparatus 50 determines YES, i.e., the operation mode is the second mode, at step S10. In this case, at step S12, the control apparatus 50 acquires the d- and q-axis current command values Id* and Iq* as the parameters that are correlated with the fundamental currents. Here, according to the present embodiment, the process at step S10 corresponds to a "mode switching unit". The process at step S12 corresponds to a "parameter acquiring unit".

At step S14, the control apparatus 50 selects the amplitude Ψz and the phase θz of the harmonic voltage Vz based on the command value map MPS stored in the storage unit 57, and the d- and q-axis current command values Id* and Iq* acquired at step S12. At subsequent step S16, the control apparatus 50 calculates the suppression command value R* based on the amplitude Ψz and the phase θz selected at step S14.

At step S18, the control apparatus 50 corrects the suppression command value R* calculated at step S16. Specifically, the control apparatus 50 corrects the amplitude of the suppression command value R* based on the temperature TM of the rotating electric machine 10 detected by the temperature sensor 56. At subsequent step S20, the control apparatus 50 corrects the U-, V-, and W-phase voltage command values Vu*, Vv*, and Vw* based on the suppression command value R* corrected at step S18. Specifically, the control apparatus 50 corrects the U-, V-, and W-phase voltage command values Vu*, Vv*, and Vw* by adding the suppression command value R* to the U-, V-, and W-phase voltage command values Vu*, Vv*, and Vw*.

At step S22, the control apparatus 50 calculates the first and second driving signals SG1 and SG2 based on the U-, V-, and W-phase voltage command values Vu*, Vv*, and Vw*corrected at step S20. The control apparatus 50 then ends the control process. The first and second driving signals SG1 and SG2 are calculated based on the corrected U-, V-, and W-phase voltage command values Vu*, Vv*, and Vw*. Therefore, the first and second driving signals SG1 and SG2 are calculated to suppress the harmonic voltage Vz that is generated in the rotating electric machine 10. Consequently, the inverters 20 and 30 can be controlled to suppress the harmonic voltage Vz using the first and second driving signals SG1 and SG2. Here, according to the present embodiment, the processes at step S14 to S22 correspond to a "control unit".

Figure 10A:
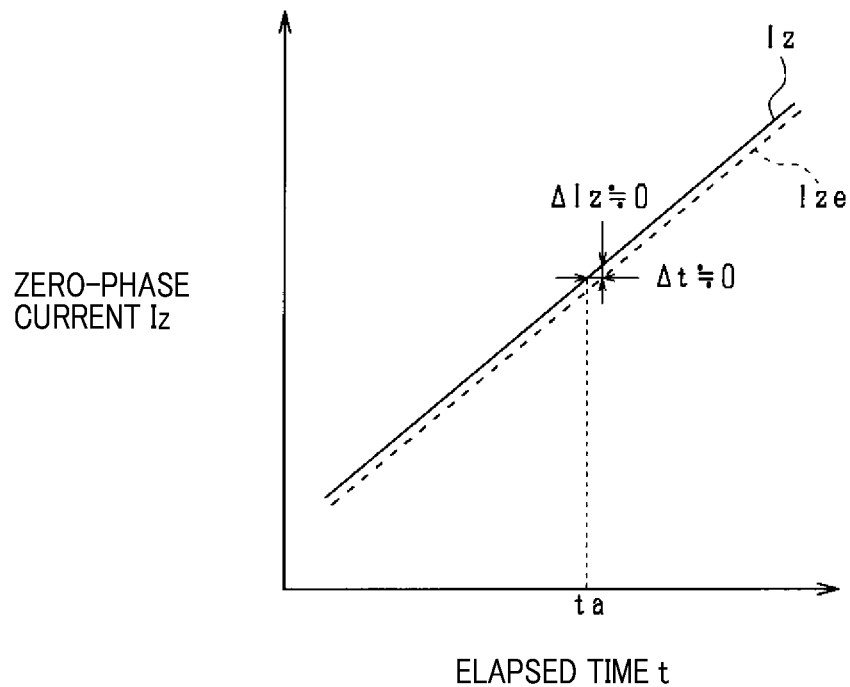
FIGS. 10A and 10B are diagrams of a process of suppressing a zero-phase current in the control process.
Figure 10B:
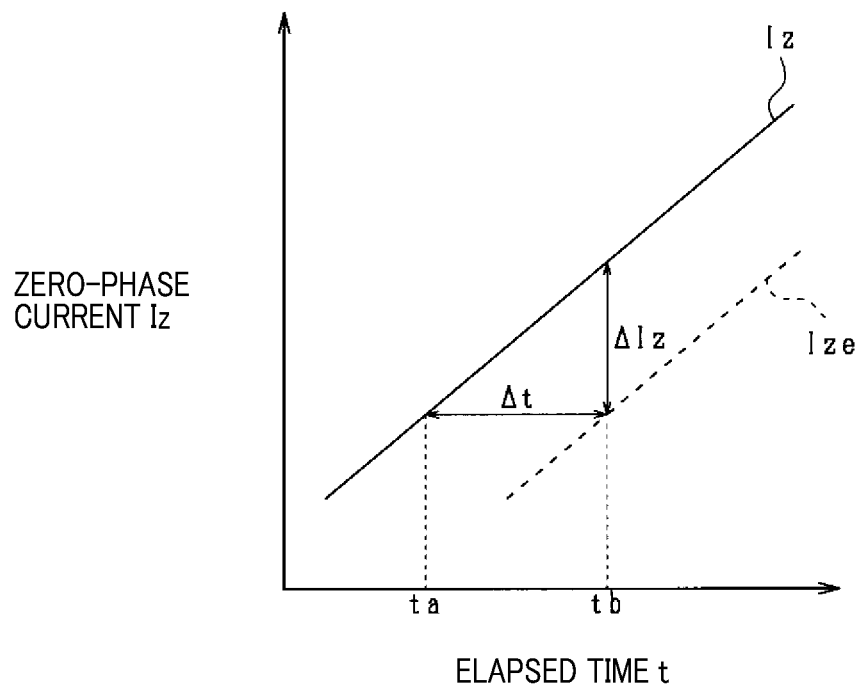

Next, FIGS. 10A and 10B show an example of the control process. FIGS. 10A and 10B show a process in which the zero-phase current Iz is suppressed when the zero-phase current Iz increases in accompaniment with elapsed time t based on acceleration of the vehicle is shown. FIG. 10A shows a process of suppression of the zero-phase current Iz in the control process according to the present embodiment. FIG. 10B shows a process of suppression of the zero-phase current Iz in a conventional technology.

As shown in FIG. 10B, in the conventional technology, an average value of the zero-phase voltage Vz is used in suppression of the zero-phase current Iz. Calculation of the average value requires the zero-phase voltage Vz to be detected at a plurality of timings, and the average value of the detected zero-phase voltages Vz to be calculated. The predetermined calculation period Δt is required. Therefore, the zero-phase current Iz cannot be suppressed with favorable responsiveness.

For example, in the conventional technology, a case in which the average value of the zero-phase voltages Vz is calculated to suppress the zero-phase current Iz at a predetermined time to is assumed. Here, in FIG. 10B, calculating the average value of the zero-phase voltages Vz is expressed as calculating a suppression zero-phase current Ize to suppress the zero-phase current Iz. In the conventional technology, because the calculation period Δt is required for the calculation of the average value, the suppression zero-phase current Ize at time ta is calculated at time tb that is later than time ta by the calculation period Δt. Therefore, as in the example in FIG. 10B, when the zero-phase current Iz increases in accompaniment with the elapsed time t, even if the zero-phase current Iz at time tb is suppressed based on the suppression zero-phase current Ize at time tb (the zero-phase current Iz at time ta), a significant difference ΔIz occurs between the zero-phase current Iz and the suppression zero-phase current Ize. As a result, the zero-phase current Iz cannot be suppressed with favorable responsiveness using the suppression zero-phase current Ize.

As shown in FIG. 10A, according to the present embodiment, the command value map MPS is stored in the storage unit 57. In the command value map MPS, the amplitude Ψz and the phase θz of the harmonic voltage Vz are prescribed in advance in correspondence to the d- and q-axis current command values Id* and Iq* correlated with the fundamental currents. In the control process according to the present embodiment, the suppression zero-phase current Ize is calculated using the command value map MPS.

According to the present embodiment, the command value map MPS is prescribed in advance. Therefore, the calculation period Δt is substantially zero. The zero-phase current Iz at the predetermined time ta is estimated at this time ta. Therefore, as in the example shown in FIG. 10A, even when the zero-phase current Iz increases in accompaniment with the elapsed time t, the difference ΔIz that occurs between the zero-phase current Iz and the suppression zero-phase current Ize is substantially zero. As a result, the zero-phase current Iz can be suppressed with favorable responsiveness using the suppression zero-phase current Ize.

According to the present embodiment described in detail above, the following effects are obtained.

In the rotating electric machine system 100 that includes the rotating electric machine 10 that has the open-end winding 11, when the rotating electric machine 10 is driven using the first inverter 20 and the second inverter 30, the zero-phase current Iz that flows to the rotating electric machine 10 may not become zero. For example, in this rotating electric machine system 100, the rotating electric machine 10 can be driven in the first mode in which the first inverter 20 and the second inverter 30 are driven by Y connection driving, and the second mode in which the first inverter 20 and the second inverter 30 are driven by H-bridge driving. The zero-phase current Iz that flows to the rotating electric machine 10 may not become zero in the second mode of the two operation modes. When the zero-phase current Iz flows to the rotating electric machine 10, driving loss occurs in the rotating electric machine 10. Therefore, the zero-phase current Iz is required to be suppressed. In this case, it is preferable that the zero-phase current Iz be suppressed with favorable responsiveness in response to changes in the rotation speed NE of the rotating electric machine 10.

In this regard, according to the present embodiment, the command value map MPS in which the amplitude Ψz and the phase θz of the harmonic voltage Vz, and the d- and q-axis current command values Id* and Iq* correlated with the fundamental currents are associated is stored in the storage unit 57. In addition, when the inverters 20 and 30 are controlled to suppress the harmonic voltage Vz, the inverters 20 and 30 are controlled based on the command value map MPS, and the acquired d- and q-axis current command values Id* and Iq*. Because the inverters 20 and 30 are controlled based on the command value map MPS prescribed in advance, the zero-phase current Iz can be suppressed with favorable responsiveness, compared to when the inverters 20 and 30 are controlled using the average value of the harmonic voltages Vz.

In particular, according to the present embodiment, in the command value map MPS, the d- and q-axis current command values Id* and Iq* are associated with the amplitude Ψz and the phase θz of the harmonic voltage Vz. The d- and q-axis current command values Id* and Iq* are calculated based on the torque command value Tr* that is a setting value. Therefore, feed-forward control of the inverters 20 and 30 can be performed based on the B- and q-axis current command values Id* and Iq*. Consequently, responsiveness can be improved, compared to when feedback control of the inverters 20 and 30 is performed based on the average value of the zero-phase voltages Vz.

According to the present embodiment, the command value map MPS is stored in the storage unit 57. The amplitude Ψz and the phase θz of the harmonic voltage Vz that is required for control of the inverters 20 and 30 are selected from the command value map MPS. Therefore, the appropriate amplitude Ψz and phase θz of the harmonic voltage Vz can be selected even in cases in which the correlation between the amplitude Ψz and the phase θz of the harmonic voltage Vz, and the d- and q-axis current command values Id* and Iq* cannot be easily indicated by a relational expression, such as when the correlation is non-linear. Consequently, robustness of the suppression of the zero-phase current Iz can be improved.

According to the present embodiment, the amplitude Ψz of the harmonic voltage Vz that is required for control of the inverters 20 and 30 is corrected based on the temperature TM of the rotating electric machine 10. Consequently, for example, even when the amplitude Ψz of the harmonic voltage Vz changes in accompaniment with changes in magnet temperature of the rotating electric machine 10, the zero-phase current Iz can be appropriately suppressed.

According to the present embodiment, the operation mode of the first inverter 20 and the second inverter 30 is switched between the first mode and the second mode based on the rotation speed NE of the rotating electric machine 10. Specifically, when the rotation speed NE is less than the threshold Nth, the operation mode of the first inverter 20 and the second inverter 30 is set to the first mode. In the first mode, switching loss in the inverter that is driven by neutral-point driving can be suppressed. In addition, the zero-phase current Iz can be completely suppressed.

Furthermore, when the rotation speed NE is greater than the threshold Nth, the operation mode of the first inverter 20 and the second inverter 30 is set to the second mode. In the second mode, the rotating electric machine 10 can be placed in a high-rotation state by both inverters 20 and 30 being driven by PWM driving. Meanwhile, the zero-phase current Iz may not become zero. According to the present embodiment, in the second mode, the inverters 20 and 30 are controlled based on the command value map MPS stored in the storage unit 57, and the acquired d- and q-axis current command values Id* and Iq*. Consequently, the zero-phase current Iz can be suppressed with favorable responsiveness in the second mode.

Second Embodiment

A second embodiment will be described below with reference to FIG. 11, mainly focusing on differences with the above-described first embodiment.

According to the present embodiment, the configuration of the control apparatus 50 differs from that according to the first embodiment. The control apparatus 50 according to the present embodiment differs from the control apparatus 50 according to the first embodiment in that a fundamental current extracting unit 70 is provided and the temperature correcting unit 67 is not provided.

Figure 11:
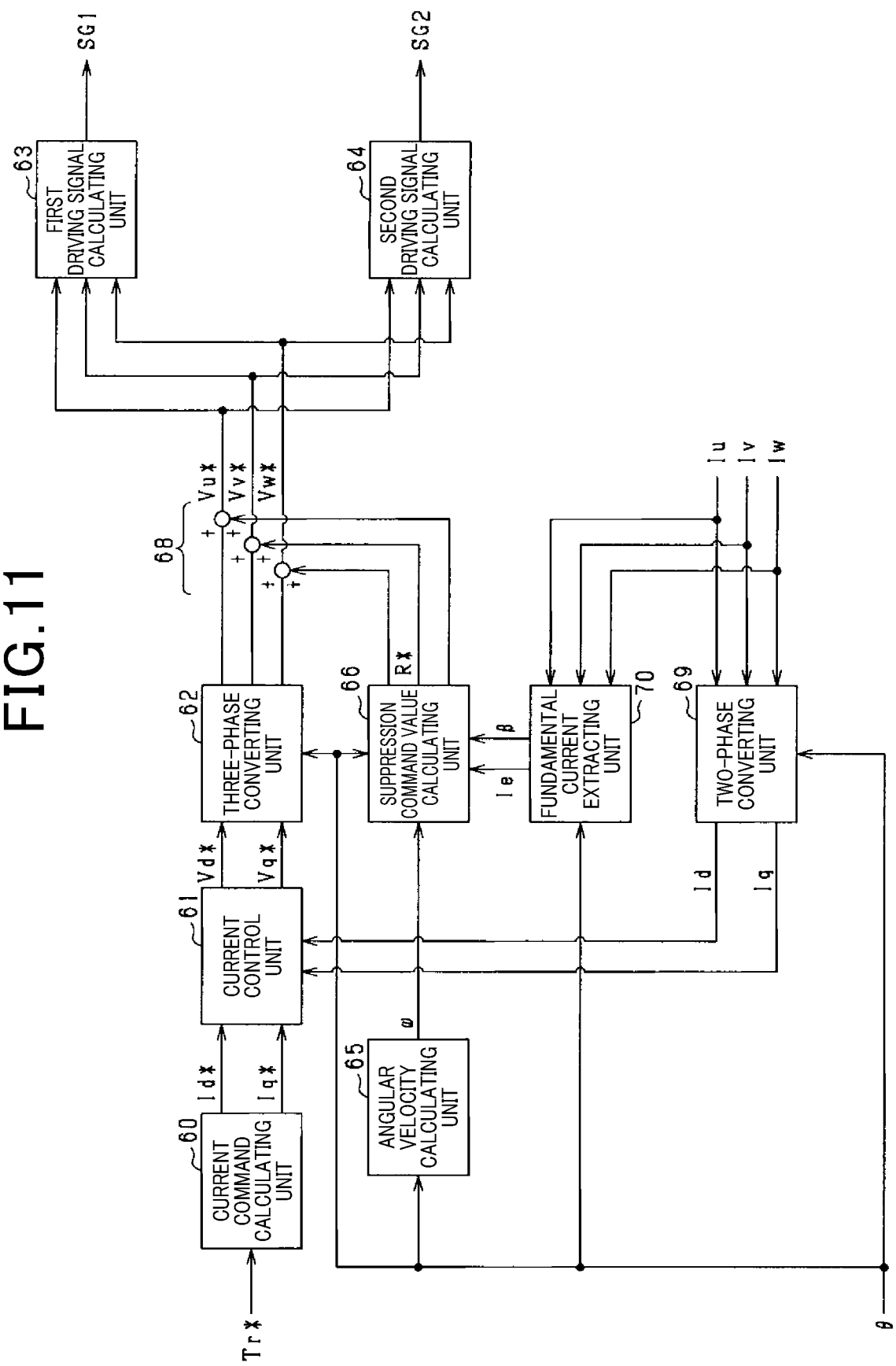
FIG. 11 is a diagram of a circuit configuration of a control apparatus according to a second embodiment.

As shown in FIG. 11, the fundamental current extracting unit 70 extracts the fundamental currents of the U-, V-, and W-phases from the phase currents Iu, Iv, and Iw detected by the current sensor 52. The fundamental current extracting unit 70 calculates the current amplitude Ie and the current phase β on the dq coordinate system based on the extracted fundamental currents and the electrical angle θ.

According to the present embodiment, the suppression command value calculating unit 66 calculates the suppression command value R* based on the current amplitude Ie and the current phase β outputted from the fundamental current extracting unit 70, the electrical angular velocity ω outputted from the angular velocity calculating unit 65, and the electrical angle θ. A detection value map MPD in which the amplitude Ψz and the phase θz of the harmonic voltage Vz are prescribed in advance in correspondence to the current amplitude Ie and the current phase β correlated with the fundamental currents is stored in the storage unit 57. The suppression command value calculating unit 66 selects the amplitude Ψz and the phase θz of the harmonic voltage Vz from the detection value map MPD stored in the storage unit 57, based on the current amplitude Ie and the current phase β, and calculates the suppression command value R*.

According to the present embodiment described above, the detection value map MPD in which the amplitude Ψz and the phase θz of the harmonic voltage Vz, and the current amplitude Ie and the current phase β correlated with the fundamental currents are associated is stored in the storage unit 57. In addition, when the inverters 20 and 30 are controlled to suppress the harmonic voltage Vz, the inverters 20 and 30 are controlled based on the detection value map MPD and the acquired current amplitude Ie and current phase β.

In particular, according to the present embodiment, the current amplitude Ie and the current phase β are associated with the amplitude Ψz and the phase θz of the harmonic voltage Vz in the detection value map MPD. The current amplitude Ie and the current phase β are calculated based on the actual phase currents Iu, Iv, and Iw that flow to the winding 11 of the rotating electric machine 10. Consequently, the zero-phase current Iz can be accurately suppressed as a result of the inverters 20 and 30 being controlled based on the current amplitude Ie and the current phase β.

Third Embodiment

A third embodiment will be described below with reference to FIG. 12, mainly focusing on differences with the above-described second embodiment.

According to the present embodiment, the configuration of the control apparatus 50 differs from that according to the second embodiment. The control apparatus 50 according to the present embodiment differs from the control apparatus 50 according to the second embodiment in that the fundamental current extracting unit 70 is not provided.

Figure 12:
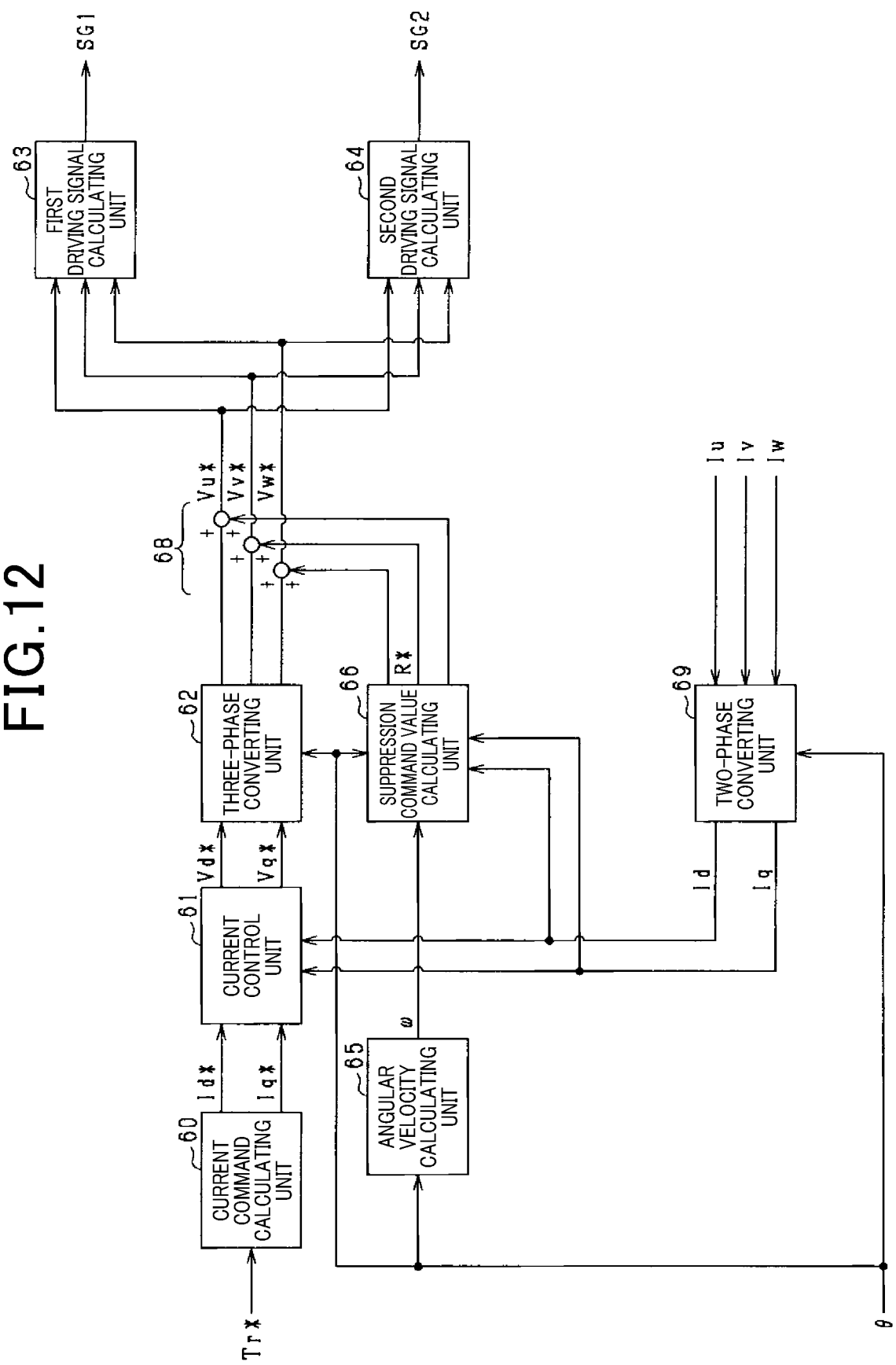
FIG. 12 is a diagram of a circuit configuration of a control apparatus according to a third embodiment.

As shown in FIG. 12, the suppression command value calculating unit 66 calculates the suppression command value R* based on the d- and q-axis currents Id and Iq outputted from the two-phase converting unit 69, the electrical angular velocity ω outputted from the angular velocity calculating unit 65, and the electrical angle θ. A detection value map MPD in which the amplitude Ψz and the phase θz of the harmonic voltage Vz are prescribed in advance in correspondence to the d- and q-axis currents Id and Iq correlated with the fundamental currents is stored in the storage unit 57. The suppression command value calculating unit 66 selects the amplitude Ψz and the phase θz of the harmonic voltage Vz from the detection value map MPD stored in the storage unit 57 based on the d- and q-axis currents Id and Iq, and calculates the suppression command value R*.

According to the present embodiment described above, the detection value map MPD in which the amplitude Ψz and the phase θz of the harmonic voltage Vz, and the d- and q-axis currents Id and Iq correlated with the fundamental currents are associated is stored in the storage unit 57. In addition, when the inverters 20 and 30 are controlled to suppress the harmonic voltage Vz, the inverters 20 and 30 are controlled based on the detection value map MPD and the acquired d- and q-axis currents Id and Iq. Because the inverters 20 and 30 are controlled based on the detection value map MPD prescribed in advance, the zero-phase current Iz can be suppressed with favorable responsiveness, compared to when the inverters 20 and 30 are controlled using the average value of the harmonic voltages Vz.

In particular, the d- and q-axis currents Id and Iq are associated with the amplitude Ψz and the phase θz of the harmonic voltage Vz in the detection value map MPD. The B- and q-axis currents Id and Iq are outputted from the two-phase converting unit 69 to the current controller 61 for calculation of the d- and q-axis voltage command values Vd* and Vq*. The suppression command value calculating unit 66 can control the inverters 20 and 30 using the d- and q-axis currents Id and Iq. Consequently, the fundamental current extracting unit 70 is not required to be provided in the control apparatus 50 for the calculation of the suppression command value R*. The configuration of the control apparatus 50 can be simplified.

Fourth Embodiment

A fourth embodiment will be described below with reference to FIG. 13 and FIG. 14, mainly focusing on differences with the above-described first embodiment.

According to the present embodiment, the configuration of the control apparatus 50 differs from that according to the first embodiment. The control apparatus 50 according to the present embodiment differs from the control apparatus 50 according to the first embodiment in that a second suppression command value calculating unit 71 and a command value adding unit 72 are provided, and the temperature correcting unit 67 is not provided. According to the present embodiment, the suppression command value calculating unit 66 is referred to as a first suppression command value calculating unit 66, for differentiation with the second suppression command value calculating unit 71.

Figure 13:
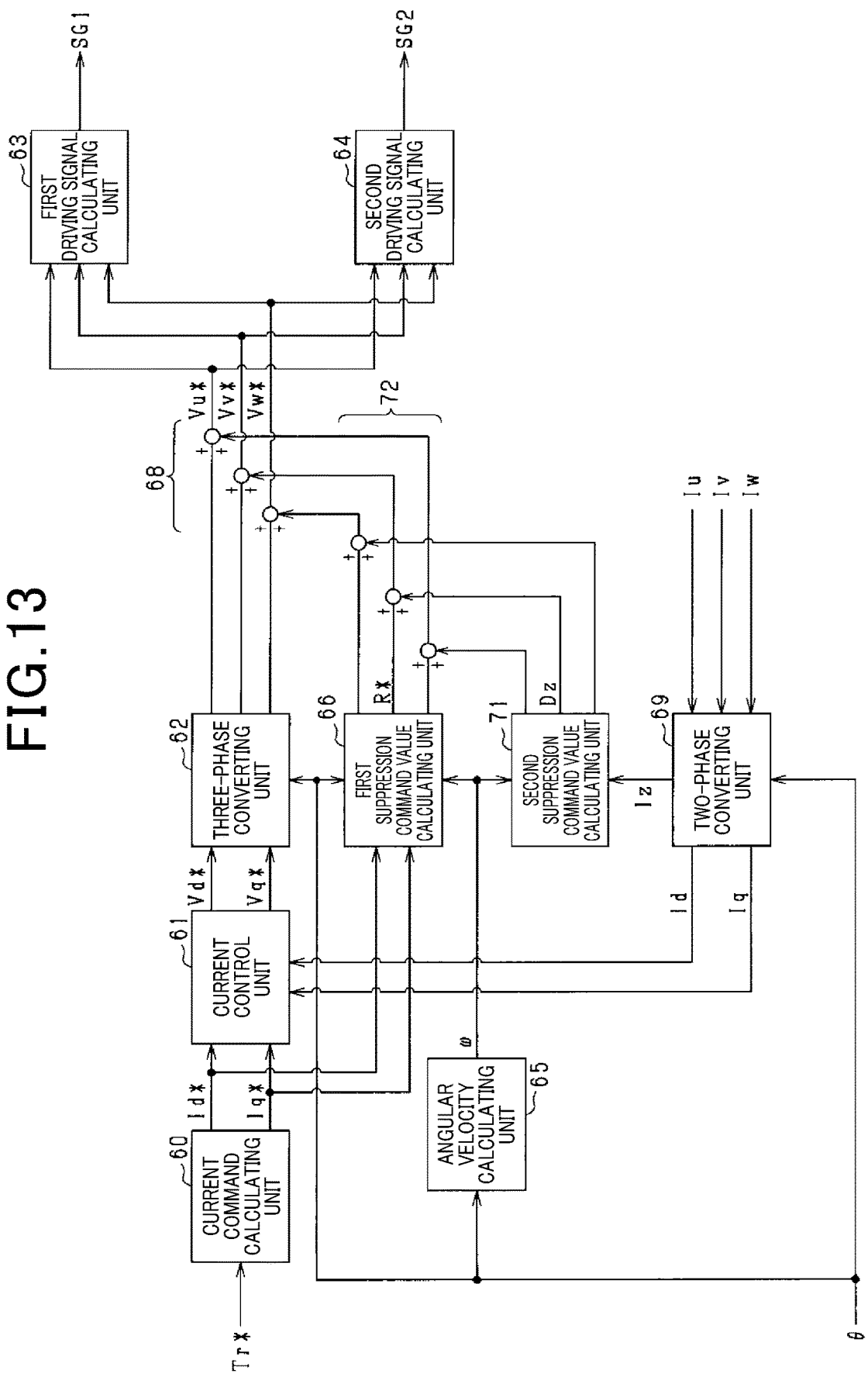
FIG. 13 is a diagram of a circuit configuration of a control apparatus according to a fourth embodiment.

As shown in FIG. 13, the two-phase converting unit 69 extracts the fundamental currents of the U-, V-, and W-phases from the phase currents Iu, Iv, and Iw detected by the current sensor 52. The two-phase converting unit 69 converts the extracted fundamental currents to the d- and q-axis currents Id and Iq. In addition, the two-phase converting unit 69 calculates the zero-phase current Iz by adding the extracted fundamental currents. The zero-phase current Iz is an alternating current and includes a third harmonic component as a main component.

The second suppression command value calculating unit 71 calculates a zero-phase current suppression command value Dz as a manipulated variable for setting the zero-phase current Iz outputted from the two-phase converting unit 69 to zero, based on the electrical angular velocity ω outputted from the angular velocity calculating unit 65 and the electrical angle θ.

The command value adding unit 72 corrects the suppression command value R* outputted from the first suppression command value calculating unit 66 using the zero-phase current suppression command value Dz outputted from the second suppression command value calculating unit 71. The command value adding unit 72 corrects the suppression command value R* by adding the zero-phase current suppression command value Dz to the suppression command value R*. A U-phase suppression command value Ru* after correction is expressed as in (Expression 4), using the zero-phase current suppression command value Dz.

$$R^* = \omega \times \Psi z \times \sin(3\theta + \theta z) + Dz \quad \text{(Expression 4)}$$

Figure 14:
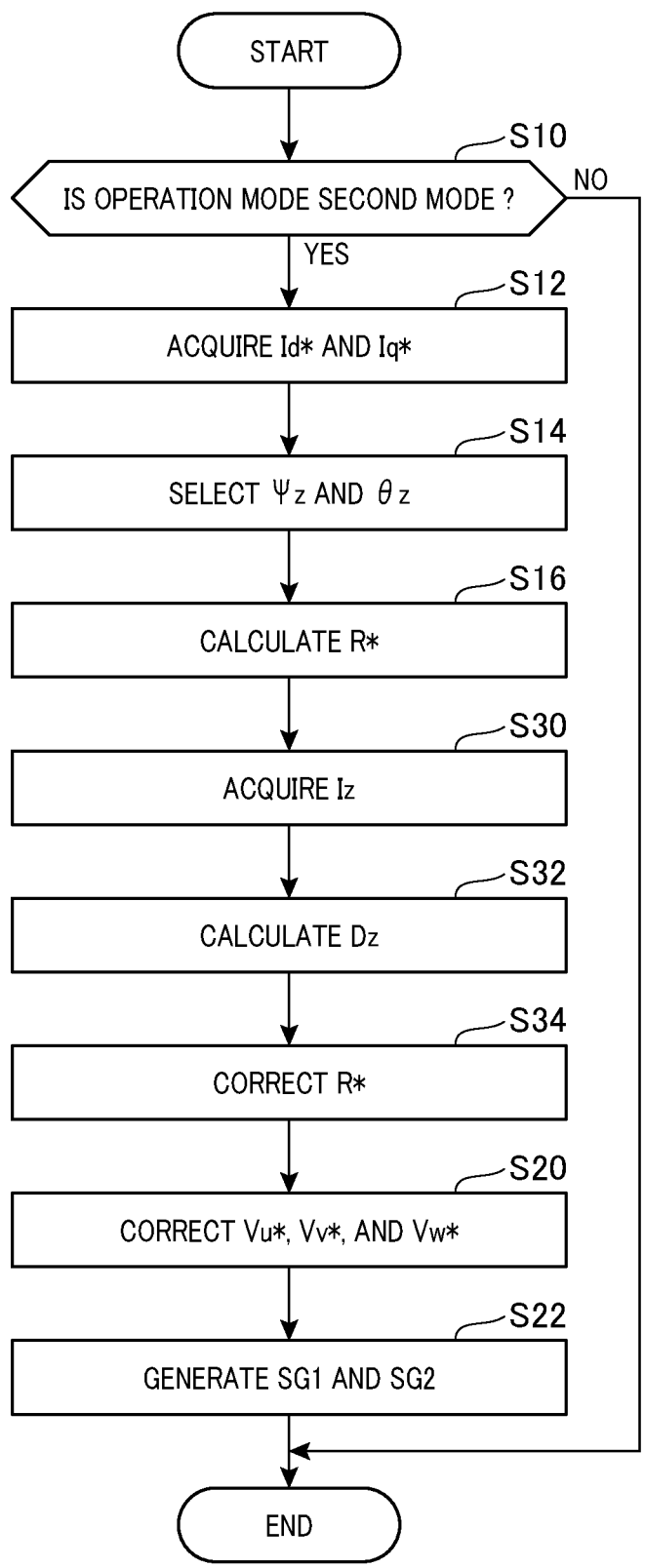
FIG. 14 is a flowchart of a control process according to the fourth embodiment.

FIG. 14 is a flowchart of a control process according to the present embodiment. According to the present embodiment, a flowchart of a control process that is performed during power running of the rotating electric machine 1 is shown. In FIG. 14, processes that are identical to those in above-described FIG. 8 are given the same reference numbers for convenience. Descriptions thereof are omitted.

In the control process according to the present embodiment, when determined YES, i.e., the operation mode is the second mode, at step S10, the control apparatus 50 acquires the d- and q-axis current command values Id* and Iq* at step S12. In addition, when the suppression command value R* is calculated at step S16, at step S30, the control apparatus 50 acquires the zero-phase current Iz from the phase currents Iu, Iv, and Iw detected by the current sensor 52. Here, according to the present embodiment, the phase currents Iu, Iv, and Iw correspond to a "detection value". The processes at steps S12 and S30 correspond to the "parameter acquiring unit".

At step S32, the control apparatus 50 calculates the zero-phase current suppression command value Dz based on the zero-phase current Iz acquired at step S30. At subsequent step S34, the control apparatus 50 corrects the suppression command value R* based on the zero-phase current suppression command value Dz calculated at step S34, and proceeds to step S20. Therefore, as a result of the inverters 20 and 30 being controlled based on the first and second driving signals SG1 and SG2 calculated at step S22, the inverters 20 and 30 can be controlled based on the d- and q-axis current command values Id* and Iq*, and the phase currents Iu, Iv, and Iw. Here, according to the present embodiment, the processes at steps S14 to S22, S32, and S34 correspond to the "control unit".

According to the present embodiment described above, the inverters 20 and 30 are controlled based on the d- and q-axis current command values Id* and Iq*, and the phase currents Iu, Iv, and Iw. The zero-phase current Iz can be suppressed with favorable responsiveness as a result of the inverters 20 and 30 being controlled based on the d- and q-axis current command values Id* and Iq*. In addition, the zero-phase current Iz can be accurately suppressed as a result of the inverters 20 and 30 being controlled based on the phase currents Iu, Iv, and Iw. Consequently, the zero-phase current Iz can be accurately suppressed with favorable responsiveness as a result of the inverters 20 and 30 being controlled based on d- and q-axis current command values Id* and Iq*, and the phase currents Iu, Iv, and Iw.

Other Embodiments

The present disclosure is not limited to the descriptions according to the above-described embodiments and may be carried out in the following manner.

The rotating electric machine 10 is not limited to a rotating electric machine that has three phases. The rotating electric machine 10 may have two phases or four or more phases. The first inverter 20 and the second inverter 30 are each merely required to be an inverter that includes a number of series-connection bodies composed of the upper and lower arm switches that amount to the number of phases of the rotating electric machine 10.

Each of the switches that are provided in the first inverter 20 and the second inverter 30 is not limited to the IGBT and may, for example, be a metal-oxide-semiconductor field-effect transistor (MOSFET). In this case, a body diode of the MOSFET can be used as the diode that is connected in antiparallel to the switch. A freewheeling diode is not required to be used separately from the MOSFET.

The degrees of the harmonic voltages that are included in the zero-phase voltage Vz are multiples of 3, excluding multiples of 6. Therefore, in addition to the third harmonic voltage, a ninth harmonic voltage, a fifteenth harmonic voltage, and the like are also present as the harmonic voltages that are included in the zero-phase voltage Vz. The zero-phase current Iz can be suppressed with favorable responsiveness as a result of correspondence information being stored for these harmonic voltages as well.

The correspondence information is not limited to the maps MPS and MPD, and may be relational expressions. For example, a relational expression FΨz that indicates the relationship between the amplitude Ψz of the third harmonic wave Vz, and the current amplitude Ie and the current phase β is expressed as in (Expression 5) using coefficients of proportion K1 to K3. In addition, a relational expression Fθz that indicates the relationship between the phase θz of the third harmonic voltage Vz, and the current amplitude Ie and the current phase β is expressed as in (Expression 6) using coefficients of proportion K4 to K6.

$$F\Psi z = K1 + K2 \times Ie^2 + K3 \times Ie \times \beta \quad \text{(Expression 5)}$$

$$F\theta z = K4 + K5 \times Ie^2 + K6 \times Ie \times \beta \quad \text{(Expression 6)}$$

In addition, the suppression command value R* is expressed as in (Expression 7) using these relational expressions FΨz and Fθz.

$$R^* = 3\omega \times F\Psi z \times \sin(3\theta + F\theta z) \quad \text{(Expression 7)}$$

These relational expressions FΨz and Fθz are stored in the storage unit 57. Storage capacity of the storage unit 57 can be reduced as a result of these relational expressions FΨz and Fθz being stored in the storage unit 57 instead of the maps MPS and MPD.

According to the above-described embodiments, an example in which the reference amplitude Ψzk selected from the command value map MPS is corrected based on the temperature TM of the rotating electric machine 10 is given. However, the present disclosure is not limited thereto. For example, the command value map MPS for each temperature TM may be stored in the storage unit 57. The amplitude Ψz may be variable set based on the temperature TM as a result of the command value map MPS being selected from the storage unit 57 based on the temperature TM, and the amplitude Ψz being set using the command value map MPS.

According to the above-described embodiments, an example in which the switchover switch 53 is provided on the high-potential-side connection line LU is given. However, the present disclosure is not limited thereto. The switchover switch 53 may be provided on the low-potential-side connection line LD. Alternatively, the switchover switch 53 may be provided on both the high-potential-side connection line LU and the low-potential-side connection line LD. Moreover, the switchover switch 53 may not be provided.

According to the above-described embodiments, the control process that is performed during power running of the rotating electric machine 10 is described. However, the control process may be performed during power generation by the rotating electric machine 10. During power generation by the rotating electric machine 10 as well, the operation mode may be switched between the first mode and the second mode based on the operation state of the rotating electric machine 109, and correspondence information in the case of power generation may be stored in the storage unit 57 together with the correspondence information in the case of power running.

According to the above-described embodiments, PWM driving is given as an example of switching driving. However, the present disclosure is not limited thereto. For example, rectangular wave driving may be performed. In rectangular wave driving, control is performed such that the upper and lower arm switches are each set to the on-state once with the dead time therebetween, during a single electrical angle period, and a switching pattern of the upper and lower arm switches of each phase is shifted from each other by 120°. In addition, overmodulation driving may be performed.

What is claimed is:

1. A control apparatus for a rotating electric machine that is applied to a rotating electric machine system that includes a rotating electric machine that has a multiple-phase winding, a first inverter that is connected to a direct-current power supply and a first end of a winding for each phase, a second inverter that is connected to a second end of the winding for each phase, a high-potential-side connection line that connects a high potential side of the first inverter and a high potential side of the second inverter, and a low-potential-side connection line that connects a low potential side of the first inverter and a low potential side of the second inverter, the control apparatus comprising:
  a parameter acquiring unit that acquires a parameter that has a correlation with a fundamental current that flows to the winding of each phase;
  a storage unit that prestores correspondence information in which the parameter is associated with an amplitude and a phase of a harmonic voltage that is generated in the rotating electric machine; and
  a control unit that controls each inverter to suppress the harmonic voltage based on the correspondence information and the acquired parameter.

2. The control apparatus for a rotating electric machine according to claim 1, wherein:
  the parameter is a command value of a current that flows to the winding of each phase.

3. The control apparatus for a rotating electric machine according to claim 1, further comprising:
  a current detecting unit that detects a current that flows to the winding, wherein
  the parameter is an amplitude and a phase of the fundamental current that flows to the winding.

4. The control apparatus for a rotating electric machine according to claim 1, further comprising:
  a current detecting unit that detects a current that flows to the winding, wherein
  the parameter is a d-axis component and a q-axis component of the fundamental current that flows to the winding in a dq coordinate system.

5. The control apparatus for a rotating electric machine according to claim 1, further comprising:
  a current detecting unit that detects a current that flows to the winding, wherein
  the parameter is a command value of the current that flows to the winding, and
  the control unit controls each inverter based on the correspondence information, the command value of the current, and the detection value of the current detecting unit.

6. The control apparatus for a rotating electric machine according to claim 1, wherein:
  the storage unit stores therein a map in which the parameter is associated with the amplitude and the phase of the harmonic voltage, as the correspondence information.

7. The control apparatus for a rotating electric machine according to claim 1, wherein:
the storage unit stores therein a relational expression that associates the amplitude and the phase of the harmonic voltage, and the parameter.

8. The control apparatus for a rotating electric machine according to claim 1, further comprising:
a temperature detecting unit that detects a temperature of the rotating electric machine, wherein
the control unit variably sets the amplitude of the harmonic voltage based on the temperature detected by the temperature detecting unit.

9. The control apparatus for a rotating electric machine according to claim 1, wherein:
the first inverter has an upper arm switch and a lower arm switch that are connected in series for each phase, and a connection point between the upper arm switch and the lower arm switch is connected to the first end of the winding of each phase;
the second inverter has an upper arm switch and a lower arm switch that are connected in series for each phase, and a connection point between the upper arm switch and the lower arm switch is connected to the second end of the winding of each phase;
the control apparatus includes
a switchover switch that is provided on at least either of the high-potential-side connection line and the low-potential-side connection line, and
a mode switching unit that,
in response to a rotation speed of the rotating electric machine being less than a threshold, switches to a first mode in which the switchover switch is in an open state, switching driving is performed of the upper and lower arm switches of one inverter of the first inverter and the second inverter, and neutral-point driving is performed in which at least either of the upper and lower arm switches of the other inverter are maintained in an on-state is performed, and
in response to the rotation speed being greater than or equal to the threshold, switches to a second mode in which the switchover switch is in a closed state, and switching driving of the upper and lower arm switches in each inverter is performed; and
the control unit controls each of the first inverter and the second inverter based on the correspondence information and the acquired parameter when the mode switching unit switches to the second mode.

* * * * *